(12) United States Patent
Squires

(10) Patent No.: US 6,510,548 B1
(45) Date of Patent: Jan. 21, 2003

(54) METHOD FOR PROVIDING PRE-DESIGNED MODULES FOR PROGRAMMABLE LOGIC DEVICES

(75) Inventor: David B. Squires, Palo Alto, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/922,994

(22) Filed: Aug. 3, 2001

(51) Int. Cl.⁷ .............................................. G06F 17/50
(52) U.S. Cl. .......................................... 716/16; 716/17
(58) Field of Search ...................................... 716/1–18

(56) References Cited

U.S. PATENT DOCUMENTS

| | | | | |
|---|---|---|---|---|
| 5,946,478 A | * | 8/1999 | Lawman ...................... | 716/17 |
| 6,205,574 B1 | * | 3/2001 | Dellinger et al. ............. | 716/16 |
| 6,301,695 B1 | * | 10/2001 | Burnham et al. ............. | 716/16 |
| 6,305,005 B1 | * | 10/2001 | Burnham et al. ............. | 716/16 |
| 6,324,676 B1 | * | 11/2001 | Burnham et al. ............. | 716/16 |

* cited by examiner

*Primary Examiner*—Vuthe Siek
*Assistant Examiner*—Sun James Lin
(74) *Attorney, Agent, or Firm*—Jeanette S. Harms; John Kubodera; Bever Hoffman & Harms

(57) ABSTRACT

A method for providing a core for a programmable logic device (PLD) is provided. In this method, a vendor can designate the size and ports of a core. Using this information, a user can generate a top-level design that can accommodate the core. The user can then submit that top-level design to the vendor, or a third party designated by the vendor, to generate a complete configuration bitstream for the PLD. The user can use this configuration bitstream to program the PLD, thereby implementing the top-level design including the core. The number of bits in this configuration bitstream is typically large enough to render reverse engineering economically unfeasible. Thus, the method allows vendors to retain control over their proprietary core IP and discourages undetectable use of this IP.

12 Claims, 5 Drawing Sheets

METHOD FOR PROVIDING PRE-DESIGNED MODULES FOR PROGRAMMABLE LOGIC DEVICES

BACKGROUND OF THE INVENTION

1. Field of the Invention

The present invention relates to programmable logic devices and specifically to providing pre-designed modules for programmable logic devices.

2. Discussion of the Related Art

Programmable logic devices (PLDs) are well known in the art of integrated circuits. A PLD can be user-programmed in the field to implement logic designs. One type of PLD is the field programmable gate array (FPGA). In a typical architecture, an FPGA includes an array of configurable logic blocks (CLBs) surrounded by programmable input/output blocks (IOBs). The IOBs provide the interface between the package pins and the CLBs, whereas the CLBs provide the functional elements for constructing logic on the FPGA. The CLBs and IOBs are interconnected by a hierarchy of programmable routing resources. These CLBs, IOBs, and programmable routing resources are customized by loading a configuration bitstream into the FPGA. This configuration bitstream is generated using software tools.

Some FPGAs, like the Virtex FGPA, can be programmed to incorporate a block with a pre-designed functionality called a "core". In one embodiment, a core can be a predetermined set of configuration bits that program the FPGA to perform one or more functions. In another embodiment, a core can include source code or schematics, which describe the logic and connectivity of a design. Typical cores can provide, but are not limited to, memories, storage elements, and math functions. Cores can be provided with an optimally floorplanned layout for specific FPGAS. Cores can also be parameterizable, thereby allowing the user to enter parameters to activate or change certain core functionality.

FIG. 1 illustrates one design flow 100 for using one or more cores in an FPGA. In design flow 100, a core generator 104, activated by system level tools 101, can receive one or more plug-in cores 102 provided by third parties. Alternatively, core generator 104 can use a core provided within a set of libraries 103, wherein these libraries 103 form part of core generator 104.

Once the core is selected, it can be provided to an FPGA software tool 106. Such FPGA software could include the Alliance™, Foundation™, or Foundation ISE™ software, all licensed by the assignee of the present invention. This software also can receive a top-level design 105 provided by a user. This top-level design designates the logic design that, in addition to the core(s), will be implemented on the FPGA. In one embodiment, FPGA software tool 106 can receive top-level designs 105 in VHDL, Verilog, or in standard schematic form. FPGA software tool 106 generates the configuration bitstream that will program an FPGA 107 to provide the functions designated by the core(s) and top-level design.

As technology improvements are realized, more complex functionality, such as microprocessor and digital signal processing (DSP) functions, can be provided in cores. However, vencors currently providing this functionality in integrated circuits have concerns regarding converting this "hard" implementation to an FPGA implementation. Specifically, an FPGA implementation (i.e. a bitstream to implement the specific functionality) can be easily proliferated and subsequently used in other FPGAs without knowledge of the vendor. Thus, vendors offering FPGA IP (i.e. intellectual property associated with a logic design) currently have substantially less control over their IP than providing the same functionality in "hard" form. Therefore, a need arises for a method of providing a core while maintaining protection and control over its associated IP.

SUMMARY OF THE INVENTION

In accordance with the present invention, a vendor can designate the size and ports of a core, i.e. a pre-designed module, for a programmable logic device. The ports include at least one input port and at least one output port. Using this information, the user can generate a top-level design that can accommodate the core. The user can then submit that top-level design to the vendor, or a third party designated by the vendor, to generate a complete configuration bitstream for the PLD. The user can use this configuration bitstream to program the PLD, thereby implementing the top-level design including the core.

In one embodiment, the top-level design includes a placeholder for the core. The placeholder has a predetermined size, i.e. the size of the core, and includes the input and output ports designated for the core. A port can be defined by the signal it is designed to receive/output. The port can also be defined by the wire that carries that signal to/from the port. The user can use a model for simulating the functioning of the core, thereby allowing the user to test the complete top-level design.

In accordance with one embodiment of the present invention, a vendor can use standard tools to generate a configuration bitstream for a user. This configuration bitstream, in addition to including the bits for implementing the core provided by the vendor, also includes the bits for implementing the remainder of the user's logic design on the PLD. The number of bits in this configuration bitstream is typically large enough to render reverse engineering economically unfeasible. In this manner, the present invention allows vendors to retain control over their proprietary core IP and discourages undetectable use of this IP.

A third party designated by the vendor(s) of one or more cores could perform the merge of the user's design and the core(s), i.e. generate the configuration bitstream for the PLD. In one business model, this third party could have a license or a franchise for the core(s).

DETAILED DESCRIPTION OF THE DRAWINGS

Figure 2:
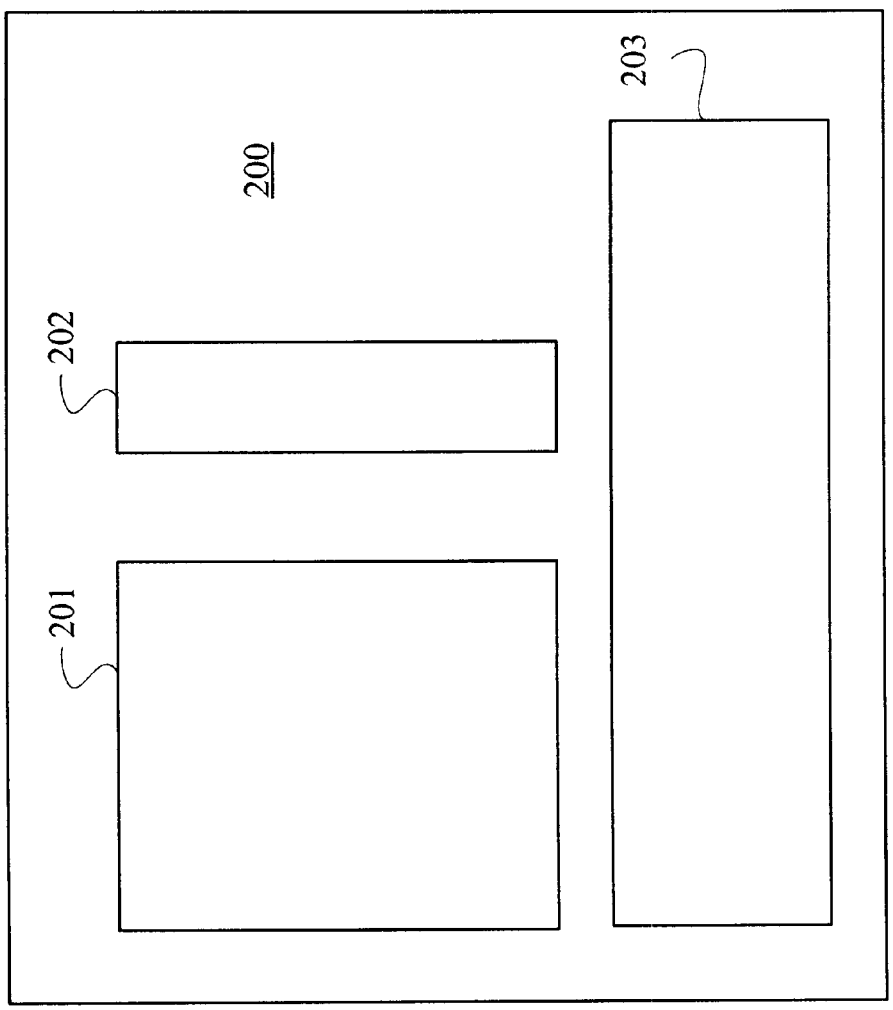
FIG. 2 illustrates a target FPGA in which a logic design therein is partitioned into physical blocks.

Modular design can significantly accelerate the implementation of a logic design in an FPGA. In modular design, a user can partition a logic design into logic blocks, wherein each logic block provides a specific functionality. These logic blocks can be implemented in physical blocks on the target FPGA using the above-described cores. In other words, the logic blocks can have corresponding physical resources designated as blocks on the FPGA. For example, FIG. 2 illustrates a target FPGA 200 in which the user has partitioned a logic design into three blocks 201, 202, and 203. After partitioning, different teams can work on the design of blocks 201, 202, and 203 in parallel, thereby saving considerable time in the logic design for FPGA 200.

Typically, each team can perform both placement and routing for each block. In placement, a CLB generated during the design of the block is assigned to a specific location in the block. In routing, the programmable routing resources between the positioned CLBs are defined by selecting wire segments and routing switches. This placement and routing, called "place and route" in the industry, is resource dependent and thus can vary based on the target FPGA. The "place and route" of each block can be done automatically by known CAD tools, manually by the team, or a combination of the two.

To facilitate the merging of blocks 201, 202, and 203 in the logic design for FPGA 200, the ports of each block can be designated. In one embodiment, a port can be defined by the signal it is designed to receive/output. In another embodiment, the port can also be defined by the wire that carries that signal to/from the port.

Figure 3:
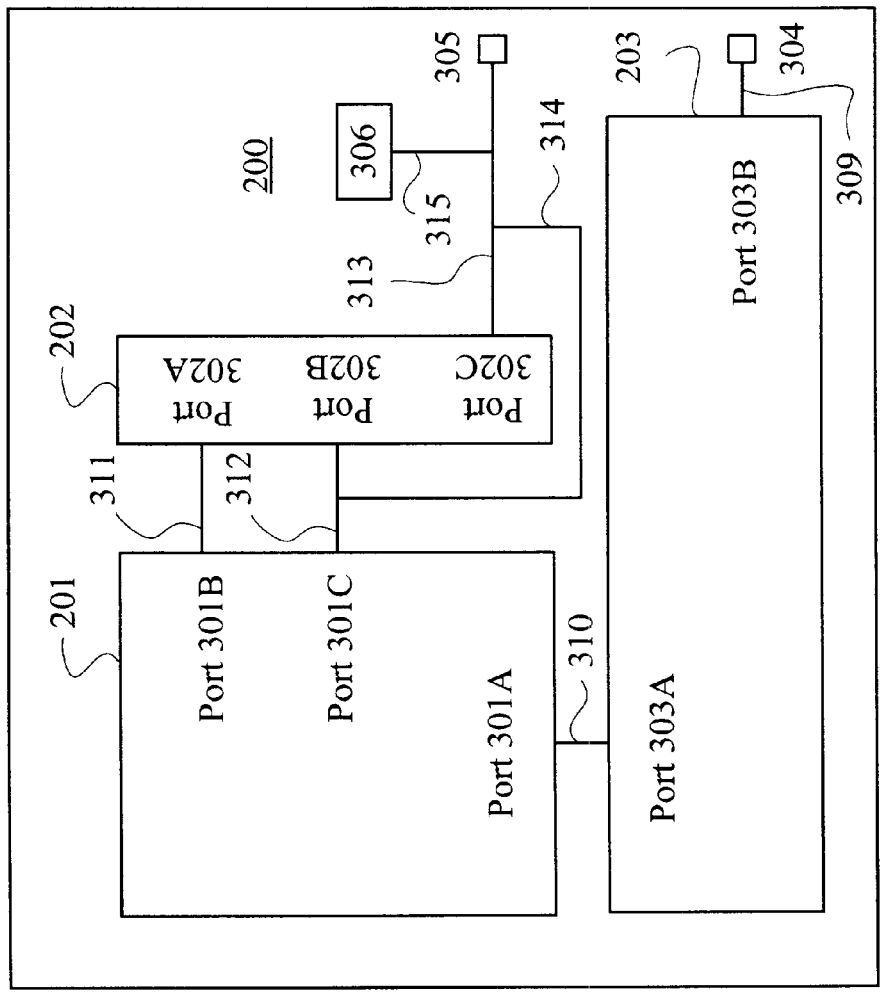
FIG. 3 illustrates some exemplary ports for the blocks on the target FPGA of FIG. 2.

FIG. 3 illustrates some exemplary ports for blocks 201, 202, and 203 on FPGA 200. Specifically, block 203 can include an input port 303B that receives a signal from an I/O block 304 (wire 309) as well as an output port 303A that provides a signal to an input port 301A of block 201 (wire 310). Block 201 can further include two output ports 301B and 301C that provide signals to two input ports 302A and 302B, respectively, of block 202 (wires 311 and 312). Finally, an output port 302C of block 202 can provide a signal to an I/O block 305 (wire 313), logic 306 not designated as a block (wire 315), as well as to its own input port 302B (wire 314). Note that each block in an FPGA includes a plurality of ports, i.e. each block includes at least one input port and at least one output port. Each block can be coupled to itself (in a feedback loop), other blocks, other logic in the FPGA not designated as a block, or one or more I/O blocks on the FPGA.

Figure 4:
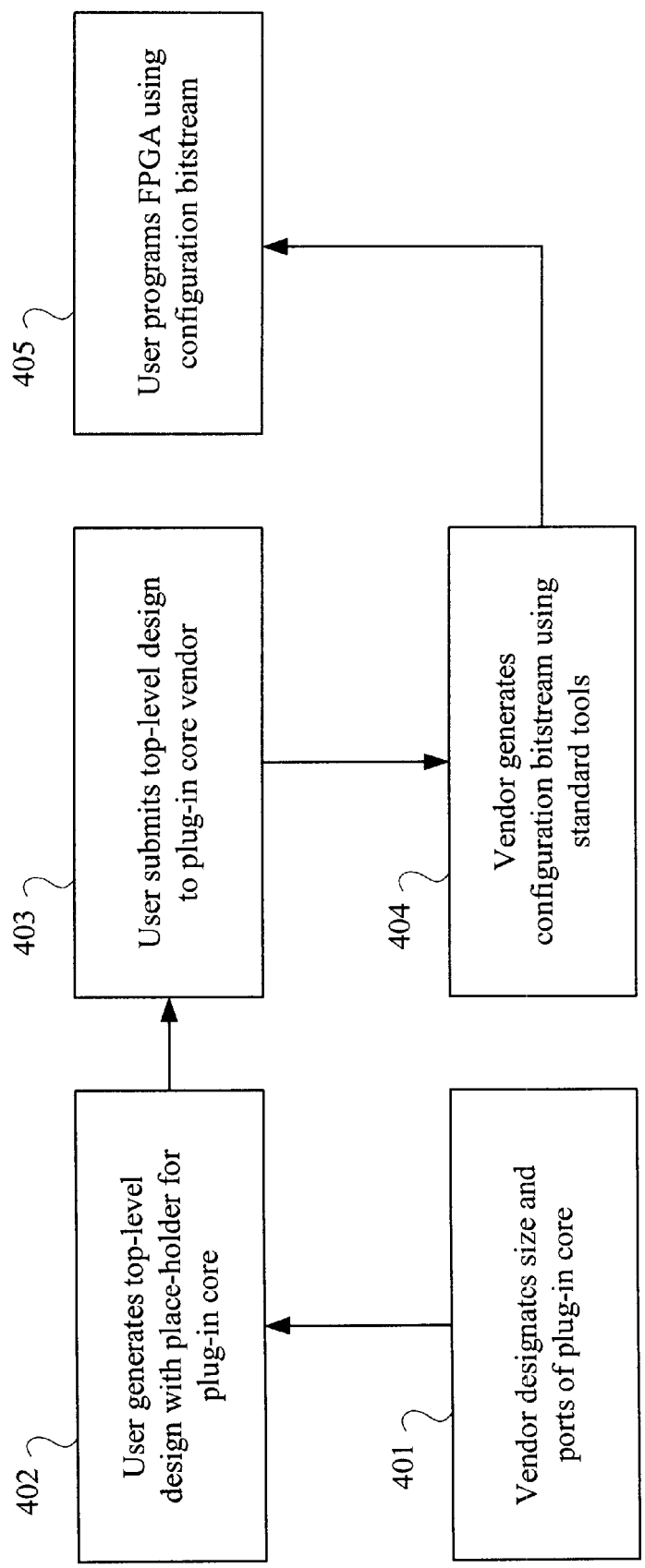
FIG. 4 illustrates a flow chart of one embodiment of the present invention.

Advantageously, a block can be implemented using a vendor-implemented/-programmed (VIP) core. In accordance with one embodiment of the present invention shown in FIG. 4, a vendor can designate the size and ports of a VIP core in step 401. Using this information, the user can generate a top-level design that can accommodate the VIP core in step 402. The user can then submit that top-level design in step 403 to the vendor, or a third party designated by the vendor, to generate a complete configuration bitstream for the FPGA in step 404. The user can use this configuration bitstream to program an FPGA in step 405, thereby implementing the top-level design including the VIP core.

Figure 5:
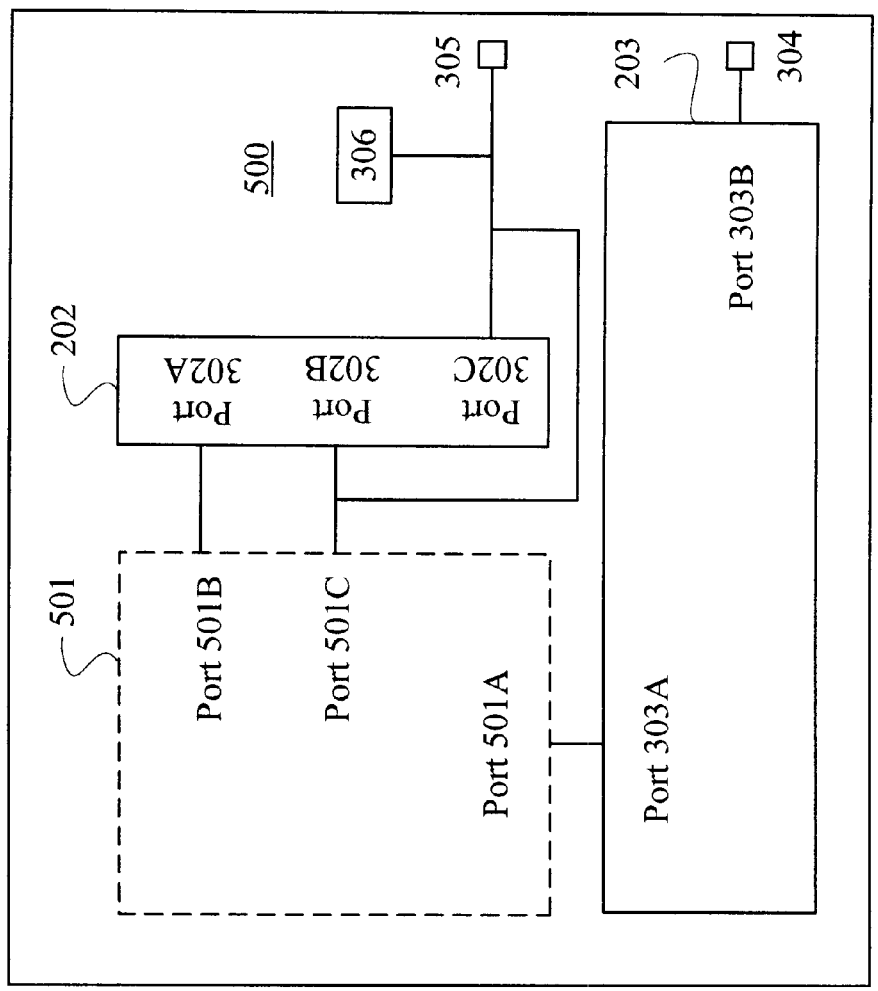
FIG. 5 illustrates an FPGA in which a user has created a placeholder for a plug-in core.

FIG. 5 illustrates an FPGA 500 in which a user has created a placeholder 501 for a VIP core. Note that placeholder 501 has the same size as the VIP core and includes certain desigrated ports. Specifically, placeholder 501 includes an input port 501A as well as two output ports 501B and 501C. Thus, placeholder 501 can accommodate, for example, block 201 having input port 301A and output ports 301B and 301C (FIG. 3). Blocks 202 and 203 can be designed by the user or can be implemented using standard plug-in cores, as described in reference to FIG. 1.

In one embodiment, the vendor can provide a core simulation model for its VIP core. Tools, such as the logic modeling SWIFT™ interface developed by Synopsys, Inc., can receive a gate-level netlist of the core in, for example, Verilog (Hardware Description Language (HDL) for circuit design and gate level simulation) and generate an output file (i.e. the model) for use in various design flows. In this manner, the user can test the complete top-level design using the model without having access to the proprietary IP associated with the VIP core.

Figure 1:
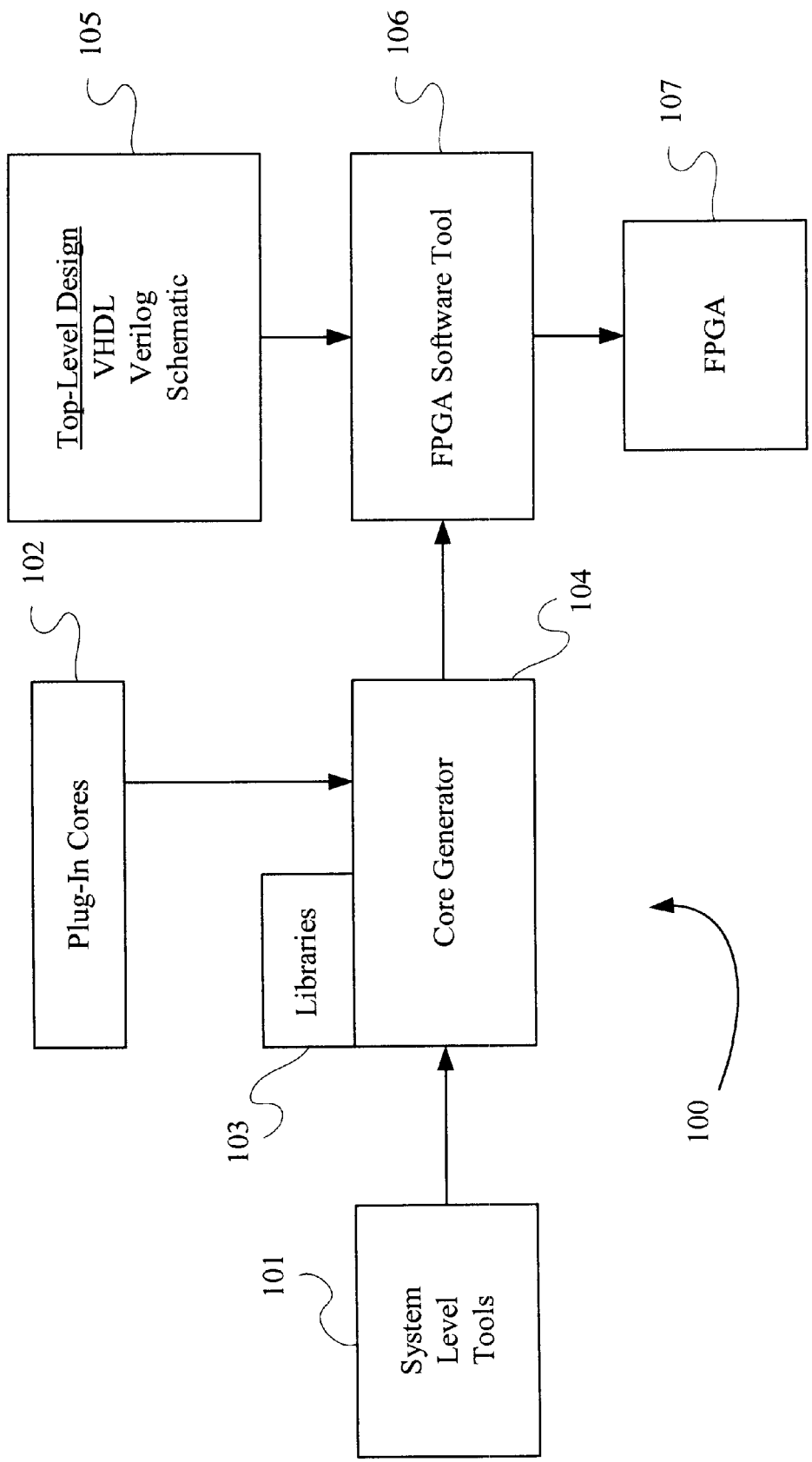
FIG. 1 illustrates a known design flow.

In accordance with one embodiment of the present invention, a vendor can use the standard tools described in FIG. 1 to generate a configuration bitstream for a user. This configuration bitstream, in addition to including the bits for implementing the VIP core provided by the vendor, also includes the bits for implementing the remainder of the user's logic design on the FPGA. The number of bits in this configuration bitstream is typically large enough to render reverse engineering economically unfeasible. In this manner, the present invention allows vendors to retain control over their proprietary IP and discourages undetectable use of this IP.

In cases where one or more placeholders are designated for VIP cores, a third party designated by the vendors of those VIP cores could perform the merge of the user's top-level design and the VIP cores, i.e. generate the configuration bitstream for the FGA. This third party could include the seller of the targe FPGA, such as the assignee of the present invention. Note that in one business model, this third party could have a license or a franchise for the VIP cores.

Although the present invention has been shown and described with respect to several embodiments, various changes and modifications would be apparent to those skilled in the art. For example, although the embodiments above refer to FPGAs, the present invention is equally applicable to any type of PLD. Therefore, the present invention is defined only by the appended claim.

What is claimed is:

1. A method of providing a pre-designed module for a programmable logic device, the method comprising:

designating a plurality of attributes regarding the module, wherein the plurality of attributes include a module size based on the programmable logic device, at least one input port, and at least one output port;

generating a top-level design to accommodate the module; and generating a configuration bitstream for implementing the top-level design and the module in the programmable logic device, wherein designating the plurality of attributes and generating the configuration bitstream are performed by a first party, and generating the top-level design is performed by a second party.

2. The method of claim 1, further including programming the programmable logic device with the configuration bitstream.

3. The method of claim 1, wherein generating the top-level design includes creating a placeholder for the module.

4. The method of claim 3, wherein the placeholder includes the module size.

5. The method of claim 4, wherein the placeholder includes the at least one input port and the at least one output port.

6. The method of claim 1, wherein designating includes defining each port by a signal the port is designed to transfer.

7. The method of claim 6, wherein designating includes defining each port by a wire for providing the signal to the port.

8. The method of claim 1, wherein designating includes defining each port by a wire coupled to the port.

9. The method of claim 1, further including simulating a functioning of the module.

10. The method of claim 1, wherein the first party obtains a license for the module.

11. The method of claim 1, wherein the first party includes a vendor of the module.

12. The method of claim 11, wherein the first party includes a third party designated by the vendor.

* * * * *